United States Patent
Haissig et al.

[11] Patent Number: 5,822,740
[45] Date of Patent: Oct. 13, 1998

[54] ADAPTIVE FUZZY CONTROLLER THAT MODIFIES MEMBERSHIP FUNCTIONS

[75] Inventors: Christine M. Haissig, Chanhassen; Michael A. Woessner, Golden Valley, both of Minn.; Dimitris K. Pirovolou, Houston, Tex.

[73] Assignee: Honeywell Inc., Minneapolis, Minn.

[21] Appl. No.: 671,997

[22] Filed: Jun. 28, 1996

[51] Int. Cl.⁶ .................................................. G06G 7/00
[52] U.S. Cl. .......................... 706/3; 706/1; 706/5; 706/8; 706/9; 706/900; 706/903; 364/160; 364/161; 364/162; 364/163
[58] Field of Search ................................ 395/900, 1, 61, 395/3; 364/160, 161, 162, 163

[56] References Cited

U.S. PATENT DOCUMENTS

| | | | |
|---|---|---|---|
| 4,837,725 | 6/1989 | Yamakawa | 364/807 |
| 5,245,695 | 9/1993 | Basehore | 395/3 |
| 5,251,288 | 10/1993 | Nomura et al. | 395/51 |
| 5,295,061 | 3/1994 | Katayama et al. | 364/157 |
| 5,307,443 | 4/1994 | Tanaka | 395/3 |
| 5,397,973 | 3/1995 | Dummermuth | 318/628 |
| 5,398,303 | 3/1995 | Tanaka | 395/51 |
| 5,422,984 | 6/1995 | Iokibe et al. | 395/51 |
| 5,440,672 | 8/1995 | Araki et al. | 395/51 |
| 5,652,485 | 7/1997 | Spiegel et al. | 318/147 |

FOREIGN PATENT DOCUMENTS

| | | | |
|---|---|---|---|
| 4430616 | 8/1983 | Germany . | |
| 2211324 | 6/1989 | United Kingdom | G06F 15/20 |
| 9001183 | 2/1990 | WIPO | G05B 13/00 |

OTHER PUBLICATIONS

Cox, Earl, "Adaptive Fuzzy Systems", IEEE Spectrum, pp. 27–31, Feb. 1993.
Karr, Charles L., "Adaptive Fuzzy Control Systems", 1995 IEEE Conference, pp. 11–13.
Lee, Fuzzy Logic in Control Systems: Fuzzy Logic Controller–Part I, IEEE Transactions on Systems, Man and Cybernetics, vol: 20 Iss:2 pp. 404–418, Mar. 1990.
Lee, Fuzzy Logic in Control Systems: Fuzzy Logic Controller–Part II, IEEE Transactions on Systems, Man and Cybernetics, vol: 20 Iss:2 pp. 419–435, Mar. 1990.

*Primary Examiner*—Allen R. Macdonald
*Assistant Examiner*—Jagdish Patel
*Attorney, Agent, or Firm*—John G. Shudy, Jr.

[57] ABSTRACT

A direct adaptive fuzzy controller having an adaptation mechanism that modifies the locations of output membership functions to improve performance of the fuzzy controller. The controller has a fuzzy rule base that has a different or unique output membership function for each fuzzy rule. The adaptation mechanism modifies the location of the output membership functions in response to the performance of the controller system, to continuously improve its performance. The controller is a feedback mechanism that functions not only using measured outputs of the process controlled, but has feedforward compensation that causes the controller to anticipate feedback due to measured disturbances or other parameters of the process. The adaptive fuzzy controller can be used for various processes, including combi-boiler domestic hot water temperature control, automobile cruise control, a residential thermostat, duct air temperature or static pressure control for the air handling unit in a heating ventilation and air conditioning system, and furnace temperature control for curing parts.

18 Claims, 9 Drawing Sheets

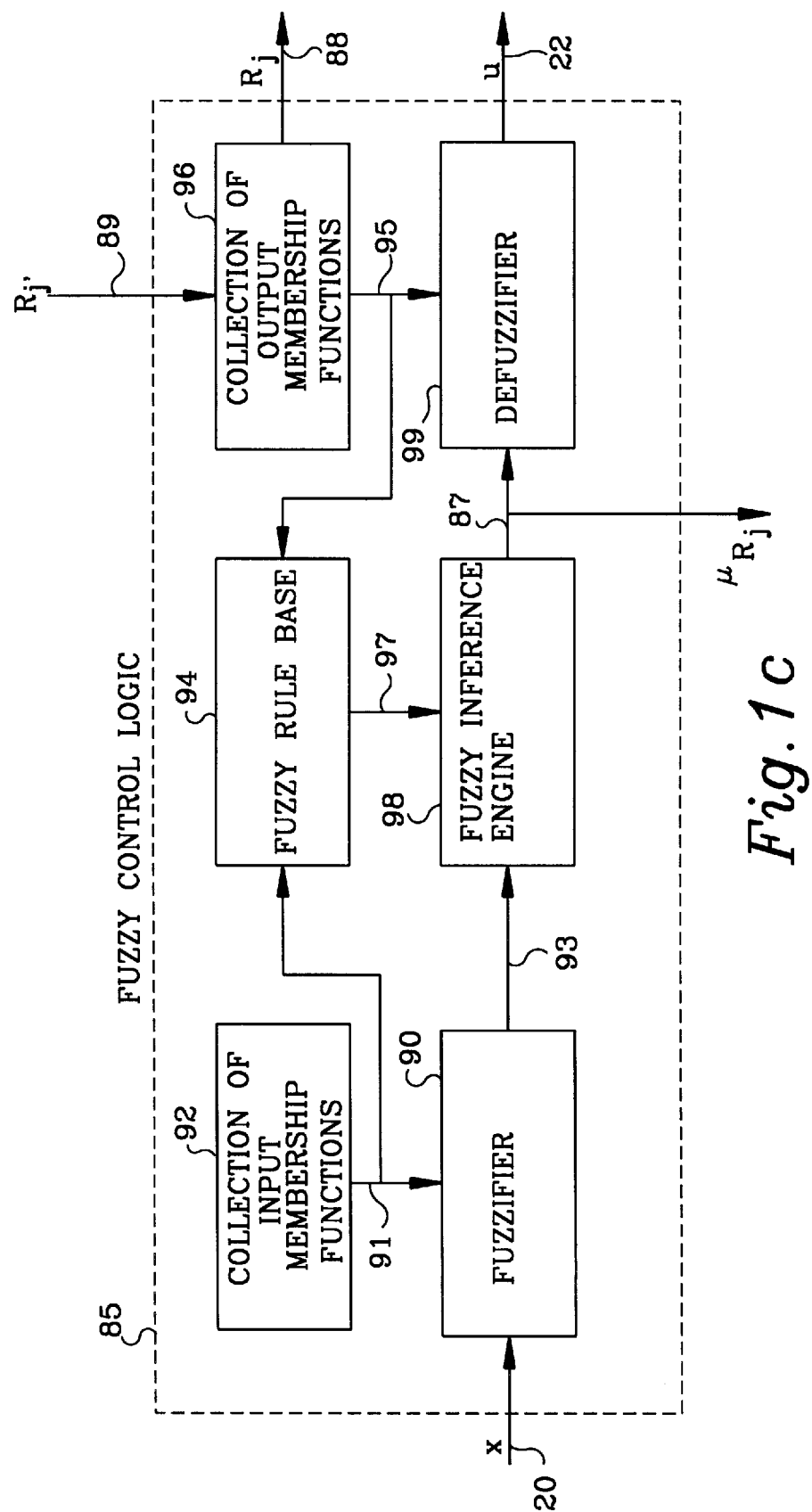

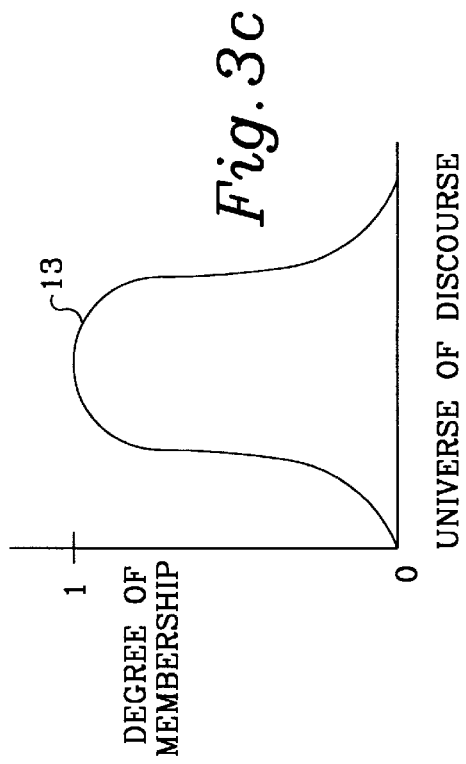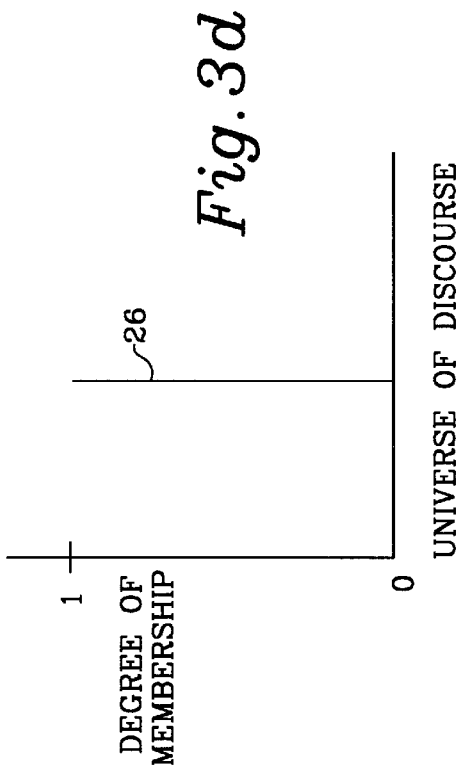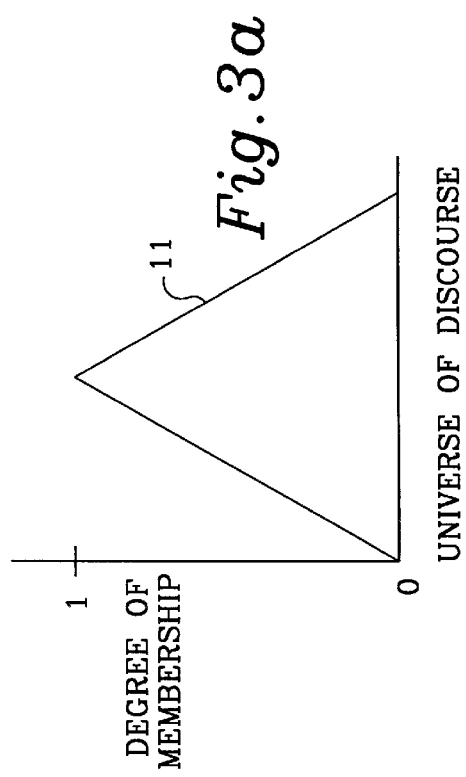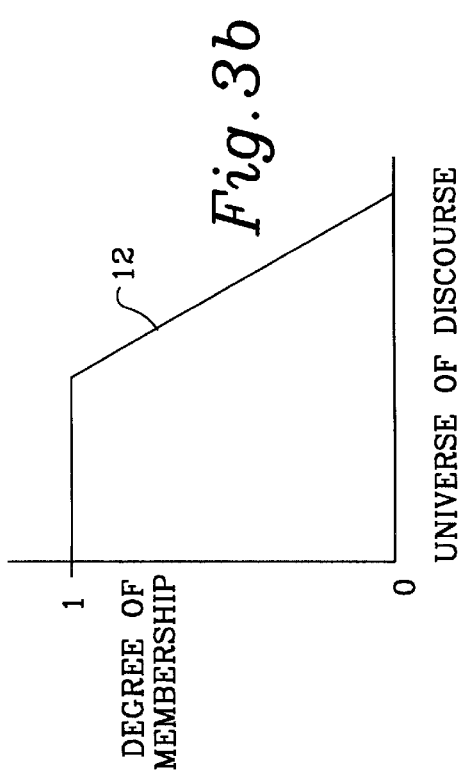

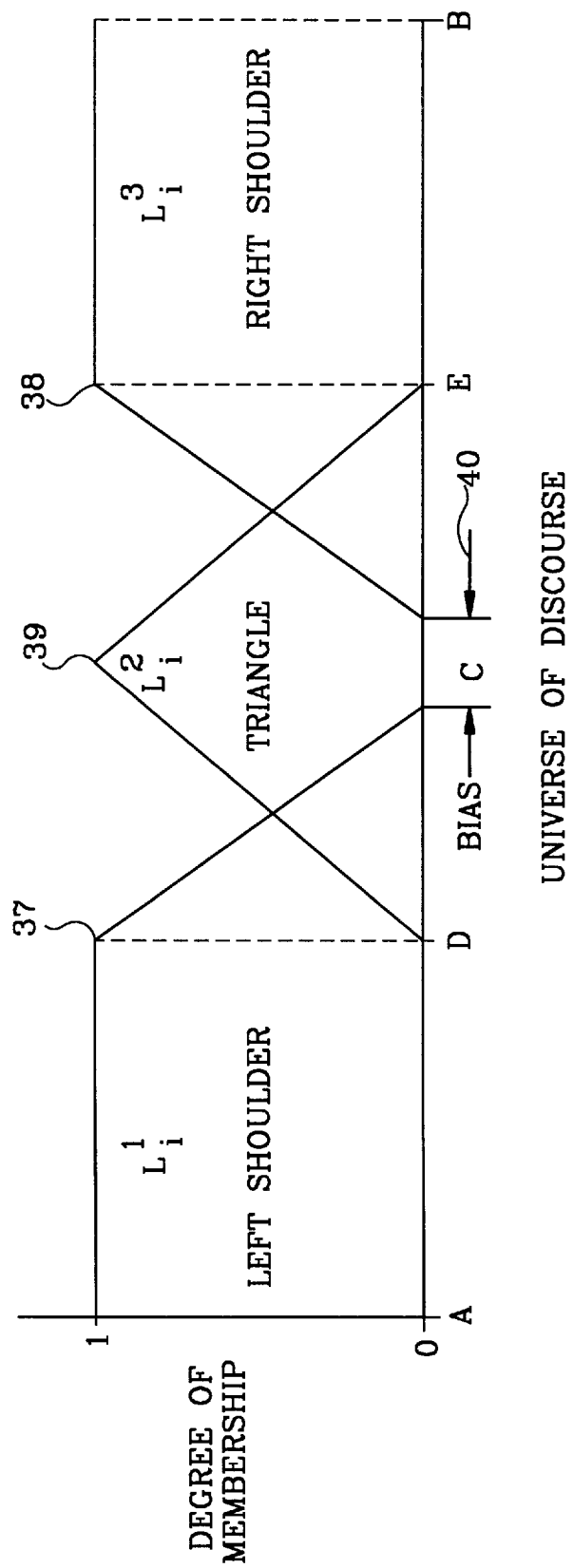

ADAPTIVE FUZZY CONTROLLER THAT MODIFIES MEMBERSHIP FUNCTIONS

FIELD OF THE INVENTION

This invention relates to a method and apparatus for controlling the output of a process so that it follows a desired profile or trajectory, and particularly, the invention is a method and apparatus for controlling such a process with an adaptive fuzzy rule-based methodology that does not require an explicit model of the system.

BACKGROUND OF THE INVENTION

In the related art, adaptive control is divided into two categories-direct adaptive control and indirect adaptive control. In direct adaptive control, the adaptation mechanism adjusts the controller parameters directly to reduce some error. For direct adaptive fuzzy controllers, the controller parameters that can be adjusted are the input membership functions, the output membership functions, and/or the rules i.e., fuzzy rules.

In indirect adaptive control, the adaptation mechanism adjusts the parameters of a process model to reduce some error, which in turn affects the control. For indirect adaptive fuzzy controllers, the process is modeled using a fuzzy model, and the parameters that are adjusted are the input membership functions, output membership functions, and/or fuzzy rules for the model.

SUMMARY OF THE INVENTION

This invention describes an adaptation mechanism for a direct adaptive fuzzy controller that modifies the locations of the output membership functions to improve performance. This adaptation mechanism does not appear to be known in the art. The mechanism offers significant advantages for many applications.

One advantage of the adaptation mechanism is that it can be applied to almost any fuzzy controller without substantial revision. Unlike most adaptation mechanisms in the art, it is simple and has minimal processing requirements.

Another advantage is that the adaptation mechanism can be used for on-line training, off-line training, or a combination of the two. Many adaptation mechanisms in the art are only suitable for off-line use and can not be used to adjust controller performance once the controller has been implemented. These adaptation mechanisms train fuzzy controllers in much the same way neural networks are trained, using backpropagation techniques, orthogonal least squares, table look-up schemes, and nearest neighborhood clustering. (See Wang, L., *Adaptive fuzzy systems and control*, New Jersey: Prentice-Hall (1994).)

Another advantage of the adaptation mechanism is that it does not rely on an explicit system model, unlike many of the on-line adaptation mechanisms such as those based on Lyapunov methods. (See Wang, 1994; Kang, H. and Vachtsevanos, G., "Adaptive fuzzy logic control," *IEEE International Conference on Fuzzy Systems*, San Diego, Calif. (Mar. 1992).) (On model-reference adaptive control, see Layne, J., Passino, K. and Yurkovich, S., "Fuzzy learning control for antiskid braking systems," *IEEE Transactions on Control Systems Technology* 1 (2), pp. 122–129 (1993).) The present system not only reduces the information that the control designer must provide but it also reduces the complexity of the adaptive fuzzy controller.

The adaptive fuzzy controller (AFC) is a nonlinear, multiple-input multiple-output (MIMO) controller that couples a fuzzy control algorithm with an adaptation mechanism to continuously improve system performance. The adaptation mechanism modifies the location of the output membership functions in response to the performance of the system. The adaptation mechanism can be used off-line, on-line, or a combination of both. The AFC can be used as a feedback controller, which acts using measured process outputs and a reference trajectory, or as a feedback controller with feedforward compensation, which acts using not only measured process outputs and a reference trajectory but also measured disturbances and other system parameters.

The adaptation mechanism can be implemented with the present fuzzy controller, or independently with another fuzzy control algorithm. When the adaptation mechanism is implemented independently, there is one restriction on the form of the fuzzy controller. The fuzzy controller must have a fuzzy rule base with a different or unique output membership function for each fuzzy rule.

BRIEF DESCRIPTION OF THE DRAWING

FIG. 1*c* reveals the apparatus of the fuzzy control logic.

FIGS. 3*a*, 3*b*, 3*c* and 3*d* show typical input membership functions that are triangular, trapezoidal, Gaussian, and singleton, respectively.

FIG. 5 is a graph of input membership functions.

DESCRIPTION OF THE PREFERRED EMBODIMENT

Figure 1A:
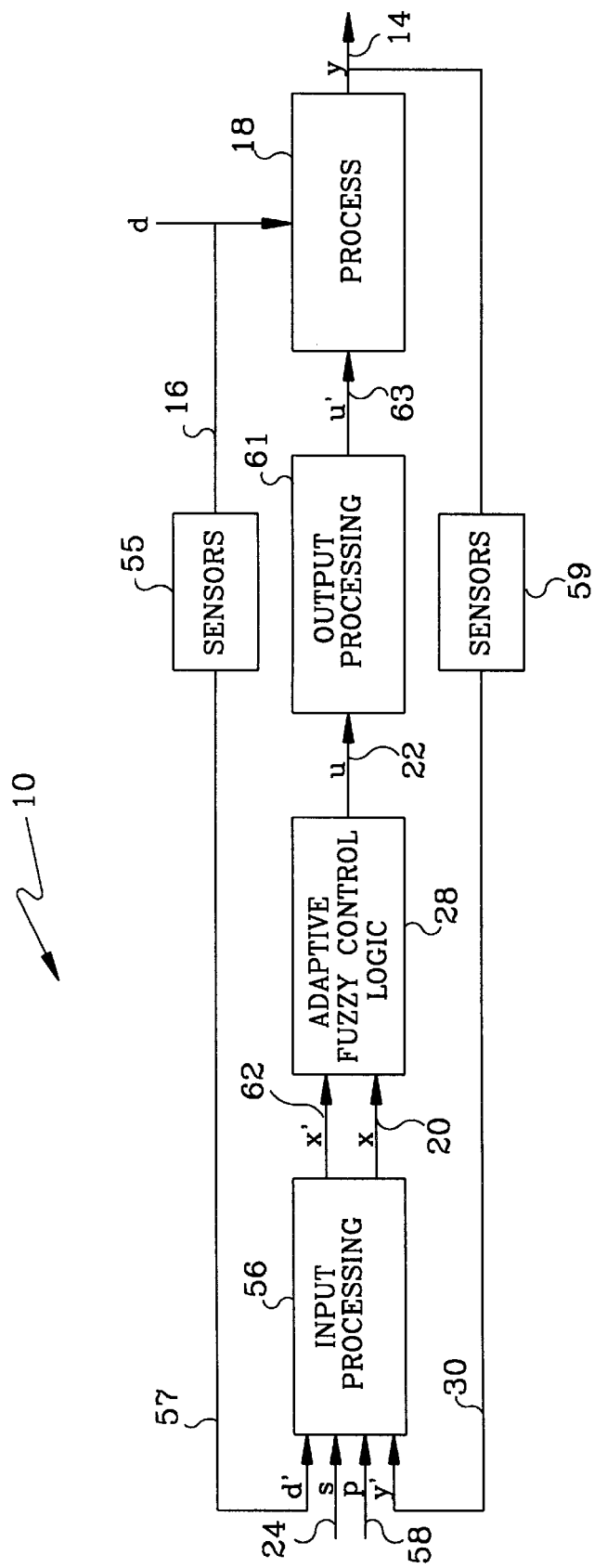
FIG. 1*a* is an overview of the system consisting of the adaptive fuzzy controller and process.

The adaptive fuzzy controller (AFC) 10 regulates the output 14 of a process 18. The overall system 10 consists of a process 18 to be controlled, adaptive fuzzy control logic 28, and input 56 and output 61 processing, which are illustrated in FIG. 1*a*.

In FIG. 1*a*, y' is a vector of measured process outputs 14, such as domestic water temperature from sensor 42 of a combi-boiler 50 (FIG. 2), or other commonly controlled physical parameters such as pressure, temperature, and flow of like systems, or speed of an automobile. y parameters are converted to electrical signals y' by sensors 59, which includes the temperature sensor 42, to signal y' to go as input 30 to input processing unit 56. y' provides feedback signals. d is a vector of measured disturbances, as noted at input 16 of process 18, such as flow rate at domestic hot water outlet 54 detected by flow rate sensor 41, air pressure from sensor 64, flue gas temperature from sensor 65, and central heating water temperature from sensor 66, which are part of sensors 55, pressure in ductwork for fan control of a heating, ventilation, and air conditioning ventilation (HVAC) system or an incline sensed via a level sensor in an automobile cruise control device. d is converted by sensors 55 into electrical signals d' which is an input 57 to a input processing section 56. d' can provide feedforward signals. s is a vector of set points or reference trajectories to input 24 of input processing 56. p is a vector of parameters, which could include set points or control positions for other parts of the system 50 and is to input 58 of processing block 56. p may be a catch-all for other parameters and may also indicate the type of processing desired by units 56 and 61. Processors 56 and 61 are design or application dependent.

Figure 2:
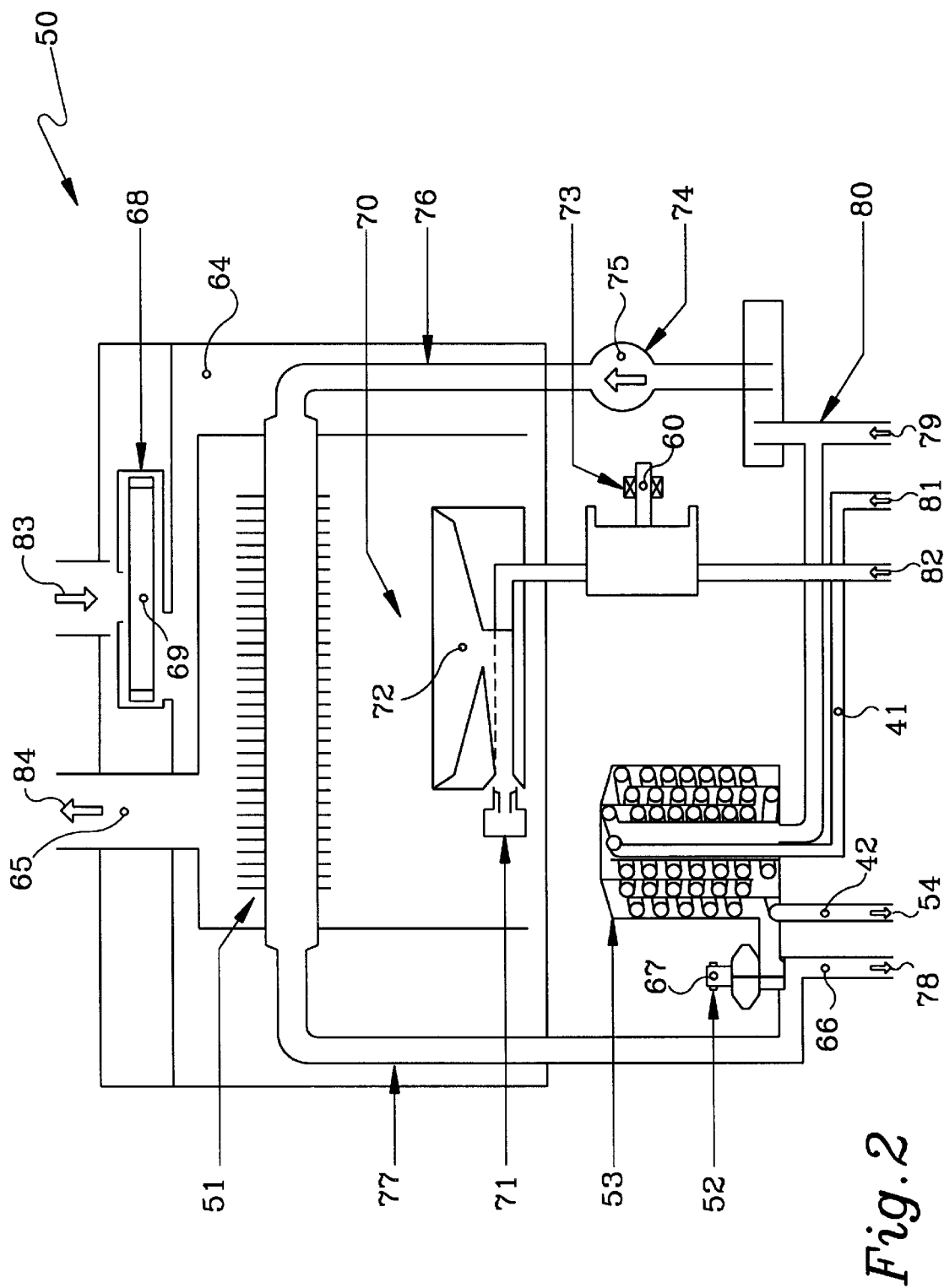
FIG. 2 is a diagram of a dual heat exchanger combi-boiler controlled by the adaptive fuzzy controller.

In FIG. 2 combi-boiler 50 also has a primary heat exchanger 51, secondary heat exchanger 53, three-way valve 52, three way valve actuator 67, fan 68, fan actuator 69, combustion process area 70, injector 71, ignition actuator 72, gas valve 73, gas valve actuator 60, pump 74, pump actuator 75, inlet pipe 76, outlet pipe 77, central heating water outlet 78, central heating water inlet 79, T-junction 80, domestic cold water inlet 81, gas inlet 82, air inlet 83 and flue gas outlet 84. y', d', s, and p are all inputs 30, 57, 24 and 58, respectively, to the input processing block 56. x is a vector of controller inputs 20 calculated from s, y', d', p, and other parameters. For example, for combi-boiler 50, x could consist of the temperature error, which is the difference between set points and the measured temperature, the derivative of the temperature error, and the measured domestic hot water outlet 54 flow rate. This is a simple example of what the input processing block 56 may do. The input processing block 56 can also perform analog-to-digital conversion, filter d' or y' to minimize the effects of sensors 55 and 59, respectively, such as noise; estimate process states from y' using Kalman filtering or another estimation technique; take derivatives or integrals of y', d', s, or p; or combine the measured or calculated parameters in any way; or transform or manipulate the input signals as specified by an application. This description of the input processing block 56 is not meant to limit its function to what has been described here but to serve as a description of a specific embodiment.

The input x on line 20 and input x' on line 62 to the adaptive fuzzy controller are used to compute the control output u on line 22, which could be the gas valve 73 actuator 60 position signal for combi-boiler 50, a gas throttle position signal for cruise control, or a fan speed signal for an HVAC system. The logic 28 output u is fed into an output processing block 61 that calculates u', which is the vector of control signals sent to process 18 on line 63. x' is a subset of x. In some situations, output processing block 61 does nothing. In other cases, u could be filtered, integrated, limited, transformed from a digital to an analog signal, or otherwise processed. Once again, this description of output processing block 61 is not meant to limit its function to what has been described here but to serve as a description of a specific embodiment.

Figure 1B:
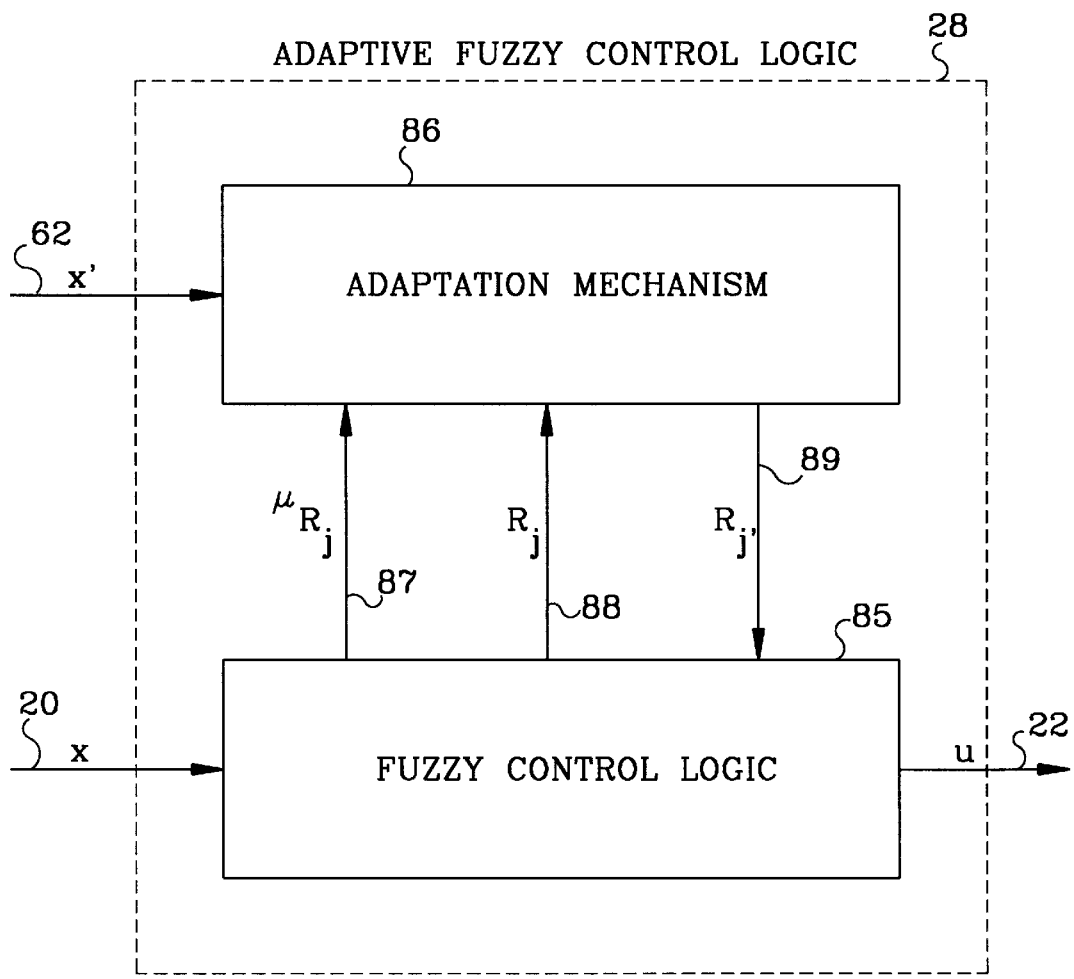
FIG. 1*b* is a block diagram of the adaptive fuzzy control logic consisting of the fuzzy control logic and the adaptation mechanism.

Adaptive fuzzy control logic 28 is fuzzy control logic 85 coupled to an adaptation mechanism 86. Adaptive fuzzy control logic 28, of figure 1b, has inputs 20 and 62 connected to outputs x and x' respectively, of processing unit 56 and has a set 22 of outputs u that goes to output processing unit 61. Adaptive fuzzy control logic 28 has an adaptation mechanism 86 has an input or set 62 of inputs x' indicating system information, a second set 87 of inputs $\mu_{Rj}$ indicating degrees of membership of fuzzy control logic rules (for each time the controller cycles, to what degree that each rule was used —1 means it was used completely and 0 means that it was not used at all, or a number "a," where 0<a<1, which means it was used partially, and further it indicates a relationship between the inputs and the outputs of the fuzzy control logic), a third set 88 of inputs Rj indicating current (present) locations of output member functions, and a set 89 of outputs $R_j'$ indicating new locations of output membership functions.

Figure 1D:
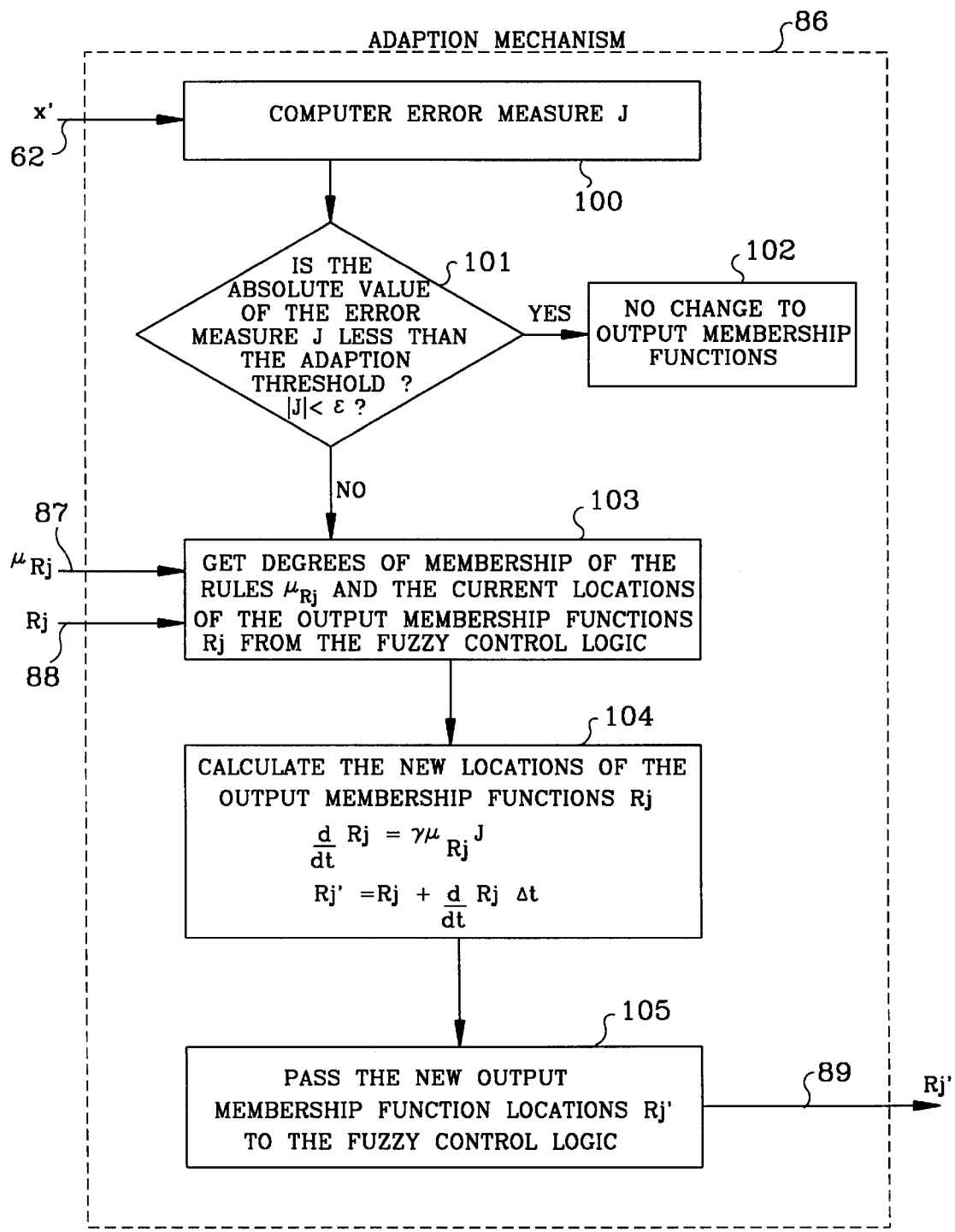
FIG. 1*d* is a functional diagram of the adaptation mechanism.

FIG. 1d illustrates adaptation mechanism 86. Unit 100 takes set 62 of inputs x' and computes an error measure J. The result of unit 100 goes to decision unit 101 which asks the question of whether the absolute value of the error measure J is less than the adaptation threshold, i.e., $|J|<\epsilon$? If the answer is yes, then there is no change to output membership functions as indicated by label 102. If the answer is no, then degrees of membership of the rules $\mu_{Rj}$ on input 87 and the current locations of the output membership functions $R_j$ on input 88 are obtained from fuzzy control logic 85. The input information to unit 103 is combined and sent to unit 104 which calculates the new locations $R_j'$ of the output membership functions $R_j$ with the following equations $$\frac{d}{dt} Rj = \gamma \mu_{Rj} J \text{ and } Rj' = Rj + \frac{d}{dt} Rj \Delta t.$$

The information of functions Rj' the new locations of the output membership functions Rj' is passed on by unit 105 to fuzzy control logic 85 via line 89.

Adaptive fuzzy control logic 28 also has a fuzzy control logic 85 having a first set 20 of inputs x for receiving (indicating) system information, a second set of inputs connected to the set of 89 outputs Rj' from adaptation mechanism 86, a first set of outputs $\mu_{Rj}$ connected to the second set 87 of inputs of adaptation mechanism 86, a second set of outputs connected to the third set 88 of inputs of adaptation mechanism 86, and a third set 22 of outputs u indicating raw control command information.

Fuzzy control logic 85 of FIG. 1c, has a fuzzifier 90 having first set 20 of inputs for receiving x signals, and a second set 91 of inputs indicating shapes and locations of input membership functions from collection of input membership functions 92, and a set 93 of outputs providing fuzzified x signals indicating shapes and locations of the input membership functions (fuzzified means taking measured or crisp values of x and transforms them into fuzzy values, in view of the input membership functions, as the set of outputs).

Collection of input membership functions 92 has a set 91 of outputs connected to second set of inputs of fuzzifier 90. Also, there is a fuzzy rule base 94 which receives a first set 91 of signals from collection of input membership functions 92, a second set 95 of signals from a collection of output membership functions 96 and a set 97 of signals indicating and mapping membership functions; that is, fuzzy rule base 94 maps a combination of input membership functions to each output membership function.

A fuzzy inference engine 98 receives a first set of inputs from set 93 of outputs of fuzzifier 90, a second set of inputs from set 97 of outputs of fuzzy rule base 94, and puts out a set 87 of outputs $\mu_{Rj}$ indicating the degree to which each fuzzy rule is used (which is the function of fuzzy inference engine 98).

Collection of output membership functions 96 has a first set 95 of outputs indicating the shape and locations of the output membership functions, a second set 88 of outputs $R_j$ indicating the current locations of the output membership functions, and a set 89 of inputs $R_j'$ indicating the new locations of the output membership functions.

A defuzzifier 99 has first and second sets of inputs, respectively, connected to set 87 of outputs $\mu_{Rj}$ from fuzzy inference engine 98 and to set 95 of outputs from collection of output membership functions 96, and a set 22 of outputs u indicating raw command information signals.

Output processing unit 61 has a set of inputs which receives set 22 of outputs u from defuzzifier 99 and has a set 63 of outputs u' indicating raw control command information which are transformed input signals u due to normalizing, scaling, filtering, integrating, taking derivatives, digital-to-analog conversion and/or other processing of raw command information into set 63 of actuating output signals u'.

Process 18 is the physical system being controlled which may be affected by parameters such as combi-boiler 50 temperatures, automobile speed, ventilation, chemical reaction, etc. Process 18 has a first set of inputs connected to set 63 of outputs u' from output processing unit 61, a second set of inputs d which are measured disturbances such as environmental effects, and a set 14 of outputs y indicating the parameter or parameters, such as temperature, speed, the state of the process, etc., being controlled.

From a methodology perspective, fuzzy controller 10 consists of a set of input 92 and output 96 membership functions, a rule base 94, a fuzzification method 90, a defuzzification method 99, and an inference method 98. Each input and output to the fuzzy controller 10 of FIG. 1 has a set of membership functions 92 and 96, respectively, associated with it. For this controller, the shape and number of membership functions 92 associated with each input can be selected freely. Typical membership functions are triangular 11, trapezoidal 12, Gaussian 13, or singleton 26 (as shown in FIGS. 3a, 3b, 3c, and 3d, respectively).

For convenience, membership functions usually have a set of linguistic labels associated with them. In general, one can refer to the labels associated with the membership functions for the $i^{th}$ input as $L_i^{k_i}$, wherein L is an input label, i signifies which input and ranges from 1 to n, where n is the number of controller inputs (or, equivalently, the dimension of x). $k_i$ indicates which membership function and ranges from 1 to $p_i$, which is the total number of membership functions for the $i_{th}$ input. FIG. 5 shows typical input membership functions—left shoulder 37, triangle 39 and right shoulder 38. For the case illustrated, $p_i$ is 3 and the linguistic labels are $L_i^1, L_i^2$, and $L_i^3$.

Figure 4:
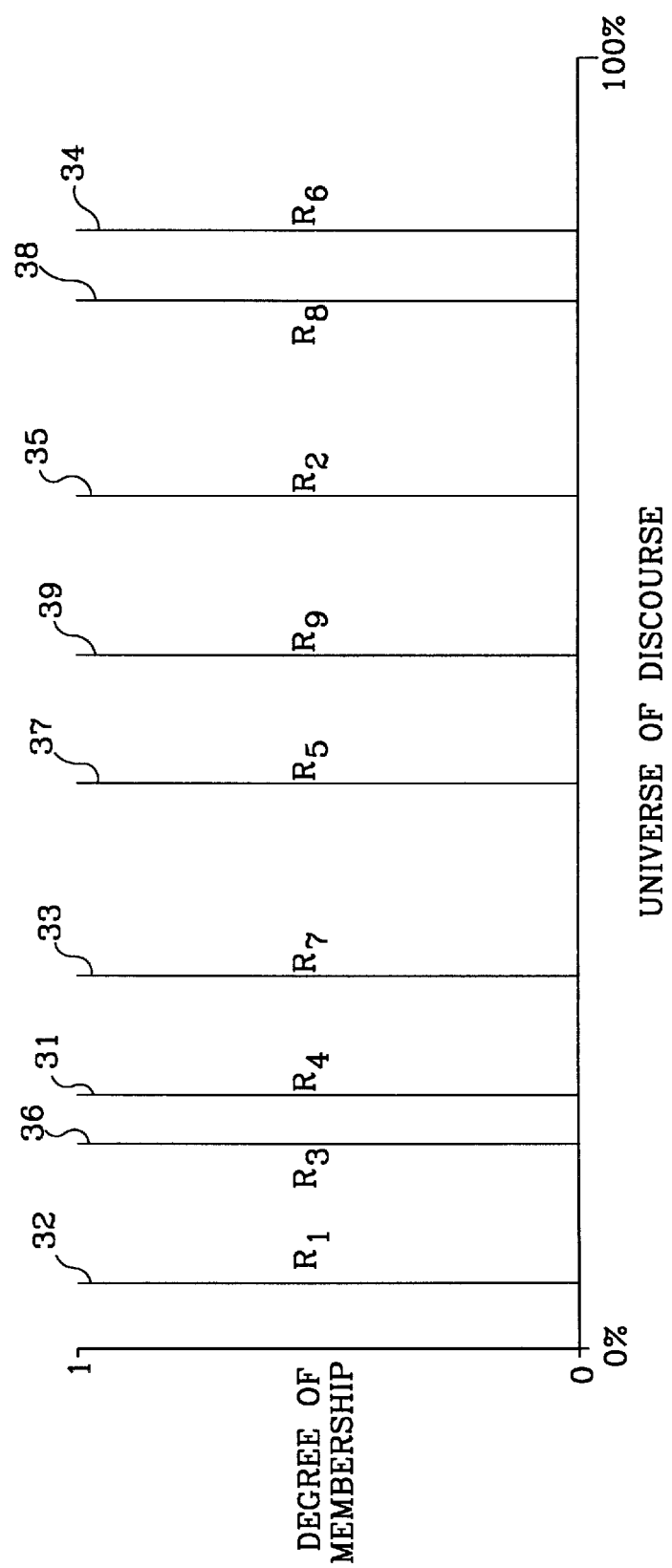
FIG. 4 illustrates the output membership functions for a nine-rule controller.

For adaptive fuzzy controller 10, the shape of the output membership functions 96 can be selected freely. However, to use adaptation mechanism 86, one must have a unique or different output membership function for each rule. For convenience, the output membership functions have the labels Rj, where j varies from 1 to r, and where r is the number of rules. Rj is used both as a label and as the location of the membership function. FIG. 4 illustrates a typical set of output membership functions 31, 32, 33, 34, 35, 36, 37, 38 and 39 for a nine-rule controller using fuzzy singletons 26. n is the number of controller inputs. r is calculated from $$r = \prod_{i=1}^{n} p_i$$

For example, for a controller having two inputs and three membership functions for each input, then p1 is 3 and P2 is 3, with P1×P2 equal to nine rules.

The fuzzy rules of base 94 are of the general form:

Rule j: IF $x_1$ is $L_1^{k_1}$ AND IF $x_2$ is $L_2^{k_2}$ AND . . . AND IF $x_n$ is $L_n^{k_n}$ THEN Uj is Rj     (1)

where Uj is the output for the $j^{th}$ rule. j varies from 1 to r. This defines a mapping between each different and unique combination of membership functions and a rule number for each output. This form of the rules is very general and most rules can be cast into this form, including non-fuzzy rules.

Fuzzifier 90, defuzzifier 99, and inference engine 98 can be selected freely. In almost every fuzzy control application, the singleton fuzzifier is used. Common defuzzifiers include the maximum defuzzifier, center of average defuzzifier, and modified center of average defuzzifier. Common inference methods include the min inference and product inference.

The adaptation mechanism updates the location of the output membership functions using the relationship $$\frac{dRj}{dt} = \gamma \mu_{Rj} J \text{ for } |J| \geq \epsilon \quad (9)$$
$$= 0 \text{ for } |J| < \epsilon$$

$$Rj = Rj' + \frac{dRj}{dt} \Delta t \quad (10)$$

Rj is the location of the output membership function for the $j^{th}$ rule. Usually, one selects Rj to be the center of the $j^{th}$ output membership function, but it can be any point on the membership function, such as the point where the membership function takes on its maximum, the left edge, or the right edge. If the output membership functions are fuzzy singletons (FIG. 3d), which are commonly used, then Rj is the location of the $j^{th}$ fuzzy singleton. Rj is bounded so it remains within the universe of discourse. It is not necessary to specify Rj accurately in advance of implementation. Rj can be initialized to any value in the universe of discourse and the algorithm will adapt or learn their locations, accordingly, to minimize |J|.

γ is the adaptation rate. It governs how quickly the controller adapts; that is, how fast the Rj change location. γ can be a constant or a variable.

J is an error measure that is being driven to zero. J is selected based on the specific control application. Frequently, J is the difference between the set point s and feedback variable y. If J is zero, the locations of the output membership functions do not change.

ε is an adaptation threshold. If the absolute value of J is inside the adaptation threshold, the locations of the output membership functions do not change. ε prevents the controller from adapting to sensor noise and small unmeasured disturbances. ε must be specified prior to implementation and can be constant or variable.

$\mu_{Rj}$ is the degree of membership of rule j. The degree of membership of each rule is a measure of how much that rule is being used to control the process. If a rule is not being used to control the process at all, its degree of membership will be zero, and the location of the output membership function for the corresponding rule will not be changed.

Δt is the adaptation sampling period, which is the time between the current time and the last time the output membership function locations were changed. Usually Δt is the same as the controller sampling period, but this is not a requirement.

Adaptation mechanism 86 can be used off-line, on-line, or a combination of the two. For example, the adaptation mechanism could be used off-line to learn the locations of output membership functions 96 that are implemented in a fuzzy controller 10 that is not adaptive. Off-line training is performed by repeatedly exercising the process and controller in simulation and/or a laboratory through their range of performance. This is frequently done by varying s, varying d', or varying both s and d'. The number of repetitions necessary depends on the number of rules in rule base 95. Experience shows that for a controller with less than thirty rules, it takes about three repetitions to learn the Rj.

Adaptation mechanism 86 can also be used on-line with no off-line training. In this case, controller 10 may have poor performance initially, unless the initial Rjs are selected accurately. Most commonly, the adaptation mechanism is used both off-line and on-line. Off-line training provides accurate estimates of Rj prior to implementation, providing better control at start-up.

There are numerous advantages to adaptation mechanism 86. One advantage of the adaptation mechanism is that it can be applied to almost any fuzzy controller.

Another advantage is that adaptation mechanism 86 can be used for on-line training, off-line training, or a combination of the two. Many adaptation mechanisms in the art are only suitable for off-line use and can not be used to adjust controller performance once the controller has been implemented. These adaptation mechanisms train fuzzy controllers in much the same way neural networks are trained, using backpropagation techniques, orthogonal least squares, table look-up schemes, and nearest neighborhood clustering (Wang, 1994).

Another advantage of adaptation mechanism 86 is that it does not rely on an explicit system model, unlike many of the on-line adaptation mechanisms such as those based on Lyapunov methods (Wang, 1994; Kang and Vachtsevanos, 1992) or model-reference adaptive control (Layne, Passino, and Yurkovich, 1993). This not only reduces the information that the control designer must provide but it also reduces the complexity of the adaptive fuzzy controller (AFC) 10.

Due to the simplicity of adaptation mechanism 86, the AFC is computationally simple and therefore suitable for real-time implementation with inexpensive processors. The code size and memory estimates needed for the adaptive fuzzy control algorithm are given in table 1, for an adaptive fuzzy controller logic 28 having n inputs, m outputs and p membership functions. The adaptive fuzzy controller code budget is estimated for a floating point C implementation. The code segment of table 1was estimated using a THINKC 6.0 compiler on a MACINTOSH. These requirements may vary for other languages and compilers.

TABLE 1

|  | n-Input m-Output Controller with p Membership Functions/Input | 2-Input, 1-Output Controller with 3 Membership Functions/Input | 1-Input, 1-Output Controller with 3 Membership Functions/Input |
| --- | --- | --- | --- |
| Code Segment[1] | 1.8 kbytes | 1.5 kbytes | 1.2 kbytes |
| Dynamic Local RAM | 11 + 4 (2 + n + m) bytes | 31 bytes | 22 bytes |
| Static Local RAM | 4 m $p^n$ bytes | 36 bytes | 12 bytes |
| ROM Constants | n (4 (2 + 2p) + $p^n$) bytes | 82 bytes | 0 bytes |
| Dynamic External RAM | 4 m $p^n$ bytes | 36 bytes | 12 bytes |

The adaptive fuzzy control algorithm can be applied to a wide range of processes for either feedback control or feedback control with feedforward compensation. Table 6 shows examples of applications for adaptive fuzzy controller 10, which include duct pressure static control and duct air temperature control for an air handling unit in an HVAC system, residential temperature control, automobile cruise control, furnace temperature control, and combi-boiler domestic hot water control temperature.

TABLE 6

| Application | Sensors | | Controlled Variable | Controller Inputs Measured Disturbance (optional) | Other (optional) | Controller Output |
| --- | --- | --- | --- | --- | --- | --- |
| Duct static pressure control for air handling unit in an HVAC system | Duct static pressure sensor | — | Duct static pressure error | Damper position | Desired duct static pressure; duct static pressure error rate | Fan speed |
| Duct air temperature control for air handling unit in an HVAC system | Duct air temperature sensor | Upstream air temperature (optional)[1] | Duct air temperature error | Upstream air temperature | Desired duct air temperature; duct air temperature error rate | Hot water valve position |
| Residential thermostat | Space temperature sensor | Outside air temperature sensor (optional)[2] | Space temperature error | Outside air temperature | Desired space temperature; desired space temperature error rate | Gas valve relay |
| Automobile cruise control | Speedometer or rotational speed sensor | Gyroscope or tilt sensor (optional)[3] | Vehicle speed error | Vehicle pitch | Desired vehicle speed; vehicle speed error rate | Throttle position |
| Furnace temperature control to cure parts | Part temperature sensor | — | Part temperature error | — | Desired part temperature; part temperature error rate | Furnace wall temperature set point |
| Combi-boiler domestic hot water temperature control | Domestic hot water temperature sensor | Domestic hot water flow rate sensor (optional) | Domestic hot water temperature error | Domestic hot water flow rate | (Supply) (Upstream) domestic hot water temperature; domestic hot water temperature error rate | Gas valve position |

Figure 1E:
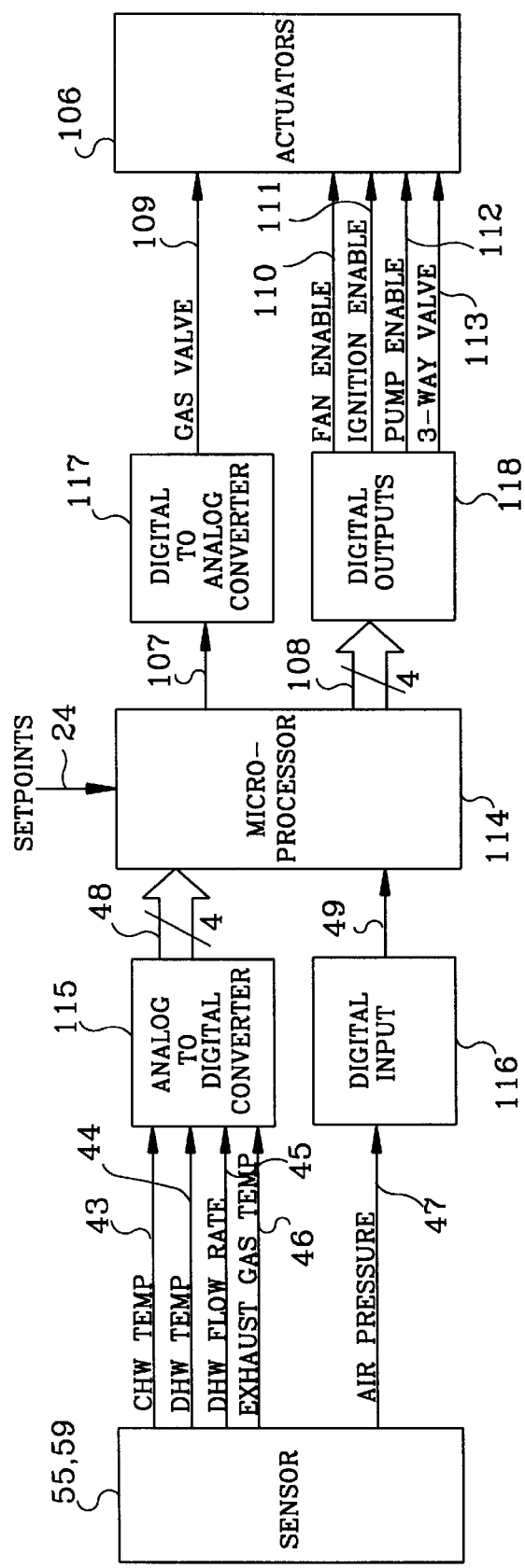
FIG. 1*e* shows a hardware layout incorporating the adaptive fuzzy controller.

Notes:
[1]Required if upstream air temperature is a controller input
[2]Required if outside air temperature is a controller input
[3]Required if vehicle pitch is a controller input FIG. 1e reveals the hardware applicable to controller 10 Sensors 55 and 59 provide analog sensor signals such as central heating water temperature sensor 66 signal 43, domestic hot water temperature sensor 42 signal 44, domestic hot water flow rate sensor 41 signal 45, and exhaust gas temperature sensor 65 signal 46 to analog-to-digital converter 115 which is part of input processing unit 56. Air pressure sensor 64 output is a digital signal 47 that goes to digital input processor 116 which is also a part of input processing unit 56. Converter 115 signals 48 and digital input processor 116 signal 49 go to a microprocessor 114. Setpoint d' signals 24 are input to microprocessor 114 which also performs some of the input processing unit 56 functions. Microprocessor 114 provides adaptive fuzzy control logic 28 processing and contains databases for such processing. Microprocessor 114 may also perform some functions of output processing unit 61. Output signals 107 and 108 go to digital-to-analog converter 117 and digital outputs processor 118 which are also a part of output processing unit 61. Converter 117 outputs a gas valve 73 control signal 109 to gas valve actuator 60 which is a part of actuators 106. Digital output processor 118 sends fan 68 enable signal 110, ignition enable signal 111, pump 74 enable signal 112 and 3-way valve 52 enable signal 113, to fan actuator 69, ignition actuator 72, pump actuator 75 and 3-way valve actuator 67, in that order, which are a part of actuators 106. Actuators 106 are incorporated in process 18.

The adaptive fuzzy control algorithm (AFC) has been applied to domestic hot water outlet 54 temperature control for combi-boiler 50. A combi-boiler is a boiler that provides both central heating water at outlet 78 for hydronic heating and hot water for domestic use. FIG. 2 shows an example of a dual-heat-exchanger combi-boiler 50, which is one type of combi-boiler construction. The central heating water is heated by the primary heat exchanger 51, which is an air-water heat exchanger. When boiler 50 senses a demand for domestic hot water, a three-way valve 52 diverts the central heating water through a secondary heat exchanger 53. Secondary heat exchanger 53 is a water-water heat exchanger that heats the domestic hot water.

The domestic hot water temperature control problem is a single- or multiple-input single-output control problem. For domestic hot water temperature control, either one or two sensors is used (table 6). The measured parameters are domestic hot water temperature and, optionally, domestic hot water flow rate. If one sensor is used, it is a domestic hot water temperature sensor 42 that is used for feedback control. In feedback control, one measures or estimates a process parameter and compares it to a set point. The difference between the process parameter and the set point is an error that is fed to controller 10 to determine the control action. For combi-boiler 50, one measures domestic hot water temperature and compares it to the domestic hot water temperature set point.

If two sensors are used, a domestic hot water flow sensor 41 is used in addition to temperature sensor 42 to provide feedforward control d' to input 57 in addition to feedback control y' to input 30. In feedforward control, one measures a disturbance that one knows will affect the process output and takes preemptive action to minimize or eliminate the undesirable process change. Usually feedforward control is used in conjunction with feedback control. For combi-boiler 50, the feedforward and feedback controls are incorporated into the same fuzzy rule base 94. Table 2 summarizes various AFC configurations that have been implemented on combi-boiler 50. In table 2, and the following discussion, temperature and temperature error are shorthand for the domestic hot water temperature and domestic hot water temperature error, while flow is shorthand for the domestic hot water flow rate.

Of input membership functions 92, there are three membership functions for each input (FIG. 5). The left membership function is a left shoulder 37, the right membership function is a right shoulder 38, and the center membership function is a triangle 39. For convenience, input membership functions 92 for each input are given linguistic labels, which are summarized in table 3.

Input membership functions 92 for each input are completely defined if the minimum and maximum values for the universe of discourse are specified, along with the bias 40 (which is illustrated in FIG. 5). FIG. 5 shows the input membership functions. A and B define the range of the universe of discourse. C is at the center of the universe of discourse. D is equidistant from A and C, while E is equidistant from C and B. With 3 membership functions per input, there are 3 rules for a one-input controller, 9 rules for a two-input controller, and 27 rules for a three-input controller (from equation (2)). For the embodiment described here, the universe of discourse and biases for the input membership functions are constants, although this is not a requirement.

Output membership functions 96 are fuzzy singletons 26, with one output membership function for each rule in the fuzzy controller. The universe of discourse for the output ranges from 0 to 100. FIG. 4 shows the output membership functions for a nine-rule controller.

TABLE 2

| Config. No. | Sensors | | Controller Inputs | | | |
|---|---|---|---|---|---|---|
| | Temperature | Flow | Temperature Error | Rate | Temp. Flow | No. of Rules |
| 1 | Yes | Yes | Yes | Yes | Yes | 27 |
| 2 | Yes | Yes | Yes | No | Yes | 9 |
| 3 | Yes | No | Yes | No | No | 3 |

TABLE 3

| Input | Left Shoulder | Linguistic Label Triangle | Right Shoulder |
|---|---|---|---|
| Temperature Error | NEGATIVE | ZERO | POSITIVE |
| Temperature Rate | NEGATIVE | ZERO | POSITIVE |
| Flow | LOW | MEDIUM | HIGH |

A fuzzy rule base 94 is noted here. Once the input membership functions 92 have been defined, a mapping between each rule and every unique combination of input membership functions 92 is made. A mapping for controller configuration no. 2 of table 2, which has temperature error and domestic hot water flow rate as inputs, is given in table 5. Table 5 summarizes the rule mapping for adaptive fuzzy controller 10 with temperature error and domestic hot water flow rate as inputs. This mapping is shorthand for fuzzy rule base 94. For instance, rule 4 is Rule 4: IF Temperature Error is NEGATIVE AND IF Flow is MEDIUM, THEN U4 is R4 (4)

$U_4$ is the output to rule 4 and $R_4$ is both the linguistic label and location of the fuzzy singleton output membership function corresponding to rule 4.

Rule 1: IF Temperature Error is NEGATIVE AND IF Flow is LOW, THEN U1 is R1

Rule 2: IF Temperature Error is ZERO AND IF Flow is LOW, THEN U2 is R2

Rule 3: IF Temperature Error is POSITIVE AND IF Flow is LOW, THEN U3 is R3

Rule 5: IF Temperature Error is ZERO AND IF Flow is MEDIUM, THEN U5 is R5

Rule 6: IF Temperature Error is POSITIVE AND IF Flow is MEDIUM, THEN U6 is R6

Rule 7: IF Temperature Error is NEGATIVE AND IF Flow is HIGH, THEN U7 is R7

Rule 8: IF Temperature Error is ZERO AND IF Flow is HIGH, THEN U8 is R8

Rule 9: IF Temperature Error is POSITIVE AND IF Flow is High, Then U9 is R9

Mappings for the other controller configurations are constructed similarly.

TABLE 5

| Rule | Temperature Error Membership Function | Flow Membership Function |
|---|---|---|
| 1 | NEGATIVE | LOW |
| 2 | ZERO | LOW |
| 3 | POSITIVE | LOW |
| 4 | NEGATIVE | MEDIUM |
| 5 | ZERO | MEDIUM |
| 6 | POSITIVE | MEDIUM |
| 7 | NEGATIVE | HIGH |
| 8 | ZERO | HIGH |
| 9 | POSITIVE | HIGH |

The control can be computed once the fuzzification 90 method, fuzzy inference engine 98 and defuzzification 99 method have been selected. For combi-boiler 50, fuzzifier 90 is the singleton 26 fuzzifier. Fuzzy inference engine 98 uses the min operator to compute the degree of membership of each rule $\mu_{R_i}$ from the degrees of membership for the corresponding input membership functions 92. For rule 4, for example $$\mu_{R_4} = \min\ (\mu\text{NEGATIVE(Temperature Error)}, \mu\text{MEDIUM(Flow)}) \quad (5)$$

where $\mu$NEGATIVE (Temperature Error) is the degree of membership of the Temperature Error in the NEGATIVE membership function and $\mu$MEDIUM (Flow) is the degree of membership of the Flow in the MEDIUM membership function and the min function takes the minimum of the two. The calculation of degrees of membership for the other rules are noted:

$\mu_{R_1}$=min($\mu$NEGATIVE(Temperature Error), $\mu$MEDIUM(Flow))

$\mu_{R_2}$=min($\mu$ZERO(Temperature Error), $\mu$LOW(Flow))

$\mu_{R_3}$=min($\mu$POSITIVE(Temperature Error), $\mu$LOW(Flow))

$\mu_{R_5}$=min($\mu$ZERO(Temperature Error), $\mu$MEDIUM(Flow))

$\mu_{R_6}$=min($\mu$POSITIVE(Temperature Error), $\mu$MEDIUM(Flow))

$\mu_{R_7}$=min($\mu$NEGATIVE(Temperature Error), $\mu$HIGH(Flow))

$\mu_{R_8}$=min($\mu$ZERO(Temperature Error), $\mu$HIGH(Flow))

$\mu_{R_9}$=min($\mu$POSITIVE(Temperature Error), $\mu$HIGH(Flow))

Once the $\mu_{R_j}$ have been computed, the control u is computed using the center average defuzzifier, $$u = \frac{\sum_{j=1}^{r} \mu_{R_j} R_j}{\sum_{j=1}^{r} R_j} \quad (8)$$

Adaptation mechanism 86 continuously updates the location of output membership functions 96 using the relationship $$\frac{dR_j}{dt} = \gamma \mu_{R_j} J \text{ for } |J| > \epsilon \quad (9)$$
$$= 0 \text{ for } |J| < \epsilon$$

where $\epsilon$ is the bias specified for the temperature membership functions. When temperature rate is not used as an input, the cost function J that is driven to zero is the tracking error:

$$J = \text{setpoint} - \text{temperature} \quad (10)$$

When temperature rate is used as an input, J is a weighted tracking error that takes into account the temperature rate $$J = (\text{setpoint} - \text{temperature}) + W \text{ (temperature rate)} \quad (11)$$

W is a constant configuration parameter that weights the effect of the temperature rate. Output membership functions 96 are constrained between 0 and 100, inclusively.

The following is a listing of the C code for the adaptive fuzzy control algorithm, which includes implementations of configurations 2 and 3 from table 2. The code consists of three files-two header files and one file with the functions for the controller.

```
**
** This file contains a single function [ control_main() ] which defines
** an adaptive fuzzy logic control (AFC) algorithm for modulating a gas
** valve to regulate the domestic hot water temperature delivered by a
** combi-boiler.
**
** This version of the AFC has two inputs to the controller—the
** domestic hot water temperature error and the domestic hot water
**
** The fuzzy controller has 3 membership functions
** associated with each input. The left membership function is a
** left shoulder, the middle membership function is a triangle, and
** the right membership function is a right shoulder. Because there
** are 3 membership functions per input and two inputs, the fuzzy
** controller uses 9 rules.
**
** There are 9 membership functions for the output. Each membership
** function is a fuzzy singleton. The AFC adapts the location
** of the 9 fuzzy singletons, which are stored in gain_vec. Defuzzification
** is performed using the center of gravity method.
**
**************************************************************************
**
*/
/*************************************************************************/
/*************************************************************************/
/*
** Number of controller inputs and fuzzy rules.
*/
```

```
#define NUM_IN        2    /* number of AFC controller inputs */
#define NUM_RULES 9        /* total number of rules == 3*NUM_IN, since each input
                              membership function has 3 membership
functions */
/*
** Control parameter definitions.
*/
#define SAMPLE_RATE      1.000                   /* controller sample rate (Hz) */
#define SAMPLE_PERIOD    (1./SAMPLE_RATE)        /* controller sample period (sec) */
#define L_FACTOR 0.06                            /* learning factor */
#define LFxSAMPLE_PERIOD (L_FACTOR*SAMPLE_PERIOD) /* eliminates one
multiplication */
/*
** Universes of discourse for the fuzzy controller inputs.
** The temperature error universe of discourse is symmetric about zero, so
** the universe of discourse range is +/- UOD_MAX_ERROR.
*/
#define UOD_MAX_FLOW     12.    /* maximum DHW flow rate (l/min) */
#define UOD_MIN_FLOW     0.     /* minimum DHW flow rate (l/min) */
#define UOD_MAX_ERROR    5.     /* maximum DHW temperature (C.) */
/*
** Bias terms for input membership functions.
*/
#define BIAS_FLOW 0.20       /* DHW flow rate bias (l/min) */
#define BIAS_ERROR 0.25      /* DHW error bias (C) */
/*
** Definition of control signal range (100 x %).
*/
#define MIN_CONTROL_SIGNAL    0.     /* lower bound of control signal */
#define MAX_CONTROL_SIGNAL    100.   /* upper bound of control signal */
/*
** Membership function center points.
*/
#define CP0_FLOW (0.25*UOD_MAX_FLOW + 0.75*UOD_MIN_FLOW)   /* center of flow
membership function 0 */
#define CP1_FLOW (0.50*UOD_MAX_FLOW + 0.50*UOD_MIN_FLOW)   /* center of flow
membership function 1 */
#define CP2_FLOW (0.75*UOD_MAX_FLOW + .0.25*UOD_MIN_FLOW)  /* center of flow
membership function 2 */
#define CP0_ERROR (-0.50*UOD_MAX_ERROR)    /* center of temp. error membership
function 0 */
#define CP1_ERROR (0.00)                   /* center of temp. error membership
function 1 */
#define CP2_ERROR (0.50*UOD_MAX_ERROR)     /* center of temp. error membership
function 2 */
/*
** Type definitions.
*/
typedef unsigned char UBYTE;       /* new single byte type */
/*
** External (global) vector of gain values used for defuzzification.
** Initialize with values from EEPROM. Should be periodically written to
** EEPROM to save newly updated (by adaptation) values.
*/
extern float gain_vec[NUM_RULES];   /* gain vector for Defuzzification */
/*
** External constants to be stored in ROM.
*/
/* center points of membership functions */
    const float cp0[NUM_IN] = { CP0_FLOW, CP0_ERROR };
    const float cp1[NUM_IN] = { CP1_FLOW, CP1_ERROR };
    const float cp2[NUM_IN] = { CP2_FLOW, CP2_ERROR };
/* membership function biases for each input */
    const float bias[NUM_IN] = { BIAS_FLOW, BIAS_ERROR };
/* maps rules to membership functions */
    const UBYTE rp[NUM RULES] [NUM_IN] =   {
                                            { 0, 0 },
                                            { 0, 1 },
                                            { 0, 2 },
                                            { 1, 0 },
                                            { 1, 1 },
                                            { 1, 2 },
                                            { 2, 0 },
                                            { 2, 1 },
                                            { 2, 2 },
                                                    };
/************************************************************************/
/************************************************************************/
/*
** Definitions for the input vector so we do not have to use local floats.
```

```
*/
#define DHW_TEMPERATURE invec[0]   /* saves 4 bytes */
#define DHW_FLOW RATE invec[1]     /* and 4 more */
#define DHW_SET_POINT invec[2]     /* and 4 more */
void control_main( invec, outvec )
     float invec[ ];             /* input vector */
     float outvec[ ];            /* output vector */
/*
** invec[0] ==> DHW temperature (C.)
** invec[1] ==> DHW flow rate (l/min)
** invec[2] ==> DHW set point (C)
** - - - - - - - - - - - - - - - - - - - - - - - - - - - - - - - -
** outvec[0] ==> gas valve control signal, 0–100
*/
/*******************************************************************************/
{
/*
** Dynamic local variables.
*/
     UBYTE i, j;                /* loop indices */
     UBYTE mf;                  /* membership function index */
     float smallest_dom;              /* minimum degree of membership for a rule */
     float deg_of_mem;          /* degree of membership, 0.0-1.0 */
     float sum_of_doms;               /* sum of all rule's degrees of membership */
     float in[NUM_IN];          /* vector of AFC controller input signals */
/*
** Static local variables to be stored in RAM and initialized to nominal values.
*/
     static float dom_r[NUM_RULES];.        /* DOM calculated for each rule */
/*******************************************************************************/
/*
** Beginning of the adaptive fuzzy control algorithm.
**
** Assign the two AFC controller inputs: the DHW flow rate and the
** temperature error.
*/
     in[0] = DHW_FLOW_RATE;
     in[1] = DHW SET_POINT – DHW_TEMPERATURE;
/*
** Do adaptation? Only if the error is significant. Also, bound the gains
** to the control signal range.
*/
     if ( fabs((double)in[1]) > BIAS_ERROR )   /* the argument of fabs is
converted to double since fabs expects a double. This is not needed for the integer implementation. */
     {
          for (i=0; i<NUM_RULES; i++)
          {
               gain_vec[i] += dom_r[i] * LFxSAMPLE_PERIOD * in[1];
               if ( gain_vec[i] < MIN_CONTROL_SIGNAL )
                    gain_vec[i] = MIN_CONTROL_SIGNAL;
               if ( gain_vec[i] > MAX_CONTROL_SIGNAL )
                    gain_vec[i] = MAX_CONTROL_SIGNAL;
          }
     }
/*
** Compute the new control signal to be transmitted to the gas valve.
** First compute the degree of membership (DOM) for all the rules
** starting with the DOM of each input. The minimum of these DOM's
** becomes the DOM for the rule.
*/
     outvec[0] = MIN_CONTROL_SIGNAL;
     sum_of_doms = 0.;
     for (i=0; i<NUM_RULES; i++)
     {
          smallest_dom = 1.;
          for (j=0; j<NUM_IN; j++)
          {
/*
** Membership function associated with the rule and input.
*/
               mf = rp[i][j];
/*
** Compute degree of membership.
*/
/*
** First check if this rule triggers the left shoulder for this input.
*/
                    if (mf == 0)
                         deg_of_mem = (in[j] – (cp1[j] – bias[j]))/(cp0[j] –
(cp1[j] – bias[j]));
```

```
/*
** Then check if the triangular membership function is triggered.
*/
                    if (mf == 1) {
                        if (in[j] < cp1[j]) /* left slope of triangle */
                            deg_of_mem = (in[j] - cp0[j])/(cp1[j] - cp0[j]);
                        else    /* right slope of triangle */
                            deg_of_mem = (-in[j] + cp2[j])/(cp1[j] -
cp0[j]);
                    }
/*
** Then check if the right shoulder is triggered.
*/
                    if (mf == 2)
                        deg_of_mem = (-in[j] + (cp1[j] + bias[j]))/(cp0[j] -
(cp1[j] - bias[j]));
/*
** Bound degree of membership between 0 and 1.
*/
                    if (deg_of_mem < 0.0) deg_of_mem = 0.0;
                    if (deg_of_mem > 1.0) deg_of_mem = 1.0;
/*
** Find the smallest degree of membership.
*/
                    if ( smallest_dom > deg_of_mem ) smallest_dom = deg_of_mem;
            }
/*
** This is minimum DOM for this rule's inputs. Save it for adaptation
** during the next iteration.
*/
        dom_r[i] = smallest_dom;
/*
** Sum the product of this rule's gain and it's current DOM. Also sum the
** rule's degrees of membership.
*/
        outvec[0] += gain_vec[i] * smallest_dom;
        sum_of_doms += smallest_dom;
    }
/*
** Calculate and bound the control signal.
*/
    outvec[0] /= sum_of_doms;
    if ( outvec[0] > MAX_CONTROL_SIGNAL ) outvec[0] = MAX_CONTROL_SIGNAL;
    if ( outvec[0] < MIN_CONTROL_SIGNAL ) outvec[0] = MIN_CONTROL_SIGNAL;
}
/****************************EOF****************************/
```

We claim:

1. A adaptive fuzzy controller for controlling a process, comprising:

an input processing unit;
an adaptive fuzzy control logic unit connected to said input processing unit;
an output processing unit connected to said adaptive fuzzy control logic unit;
a sensor proximate to the process and connected to said input processing unit; and
an actuator, for controlling the process, connected to said output processing unit; and wherein:

said adaptive fuzzy control logic unit comprises:
an adaptation mechanism connected to said input processing unit; and
a fuzzy control logic unit connected to said adaptive mechanism and to said input and output processing units;

said sensor provides a process parameter measurement to said input processing unit;
said input processing unit has an input for a process parameter setpoint;
said adaptation mechanism:
computes an error measure between the process parameter measurement and the process parameter set point;
determines whether the absolute value of the error measure is less than an adaptation threshold;
does nothing further if the absolute value of the error measure is less than the adaptation threshold;
obtains degrees of use of fuzzy rules and current locations of output rule membership functions from said fuzzy control logic unit;
calculates new locations of the output rule membership functions; and
sends the new locations to said fuzzy control logic unit;

said fuzzy control logic unit comprises:
a fuzzifier connected to said output processing means;
a fuzzy inference engine connected to said fuzzifier and to said adaptation mechanism;
a defuzzifier connected to said inference engine and to said output processing unit;
a collection of input membership functions unit connected to said fuzzifier;
a collection of output membership functions unit connected to said adaptation mechanism and said defuzzifier; and
a fuzzy rule base connected to said fuzzy inference engine, said collection of input membership functions unit and said collection of output membership functions unit;

said sensor provides an environment disturbance parameter measurement to said input processing unit;

said input processing unit has an input for receiving parameters for configuring and adjusting the adaptation fuzzy controller;
the process is hot water temperature control of a boiler;
said sensor comprises:
a temperature sensor; and
a flow rate sensor;
the process parameter measurement is hot water temperature;
the environment disturbance parameter measurement is hot water flow rate; and
said actuator is an actuator of a gas valve which controls a flow of gas to a combustion process of the boiler, for heating hot water.

2. The adaptive fuzzy controller of claim 1, wherein:
the boiler is a combi-boiler; and
the hot water is domestic hot water.

3. An adaptive fuzzy logic controller for controlling a process parameter, having an adaptive fuzzy control logic which comprises:
an adaptation mechanism for:
computing an error measure;
determining whether the absolute value of the error measure is greater than or equal to an adaptation threshold value;
obtaining degrees of membership of fuzzy rules and current locations of output membership functions of the fuzzy rules, and calculating new locations of the output membership functions of the fuzzy rules, only if the absolute value of the error measure is greater than or equal to the adaptation threshold value; and
a fuzzy control logic unit comprising:
a fuzzifier for receiving and transforming the process parameter measurement and the process parameter setpoint into a process parameter measurement signal coded with a first set of shapes and locations of input membership functions and a process parameter setpoint signal coded with a second set of shapes and locations of input membership functions;
a collection of input membership functions for providing said fuzzifier with sets of shapes and locations of input membership functions;
a collection of output membership functions, for providing current locations of output membership functions to said adaptation mechanism and for receiving new locations of the output membership functions;
a fuzzy rule base for receiving sets of shapes and locations of input membership functions from said collection of input membership functions, receiving sets of shapes and locations of output membership functions from said collection of output membership functions, and mapping a combination of input membership functions to each output membership function;
a fuzzy inference engine for receiving the process parameter measurement signal coded with a first set of shapes and locations of input membership functions and the process parameter setpoint signal coded with a second set of shapes and locations of input membership functions, receiving a mapping of a combination of input membership functions to each output membership function, indicating the degree to which each fuzzy rule is used, and providing the degrees of membership of the fuzzy rules to said adaptation mechanism; and
a defuzzifier for receiving sets of shapes and locations of output membership functions from said collection of output membership functions, receiving degrees of membership of the fuzzy rules, and providing command information signals for controlling the process.

4. The adaptive fuzzy logic controller of claim 3 wherein said adaptation mechanism calculates the new locations of the output membership functions according to $$\frac{dRj}{dt} = \gamma \mu_{Rj} J \text{ and}$$

$$Rj' = Rj + \frac{dRj}{dt} \Delta t$$

where Rj indicates the current locations of the output membership functions, $\gamma$ is an adaptation rate which controls how fast Rj changes location, $\mu_{Rj}$ is the degrees of memberships of the fuzzy rules, J is the error measure which has an absolute value to be driven to less than the adaptation threshold value by the adaptive fuzzy logic controller, and $\Delta t$ is a time cycle between each indication of new locations of the output membership functions.

5. An adaptive fuzzy logic controller comprising:
input processing means, having a plurality of inputs for receiving disturbance, setpoint, process parameter, and other parameter signals, and having at least one output, for transforming normalizing, scaling, filtering, integrating, taking derivatives, and/or analog-to-digital converting the signals into an output as specified by an application for controlling at least one process parameter;
an adaptive fuzzy control logic means, having at least one input connected to the at least one output of said input processing means, and having at least one output, wherein said adaptive fuzzy control logic means comprises:
an adaptation mechanism having a first plurality of inputs for receiving the output of said input processing means, a second plurality of inputs indicating degrees of membership of fuzzy control logic rules in that for each time the adaptive fuzzy logic controller cycles, the degree of membership being the extent that each rule was used and indicating a relationship between the inputs and the outputs of the fuzzy control logic means, a third plurality of inputs indicating current locations of output member functions, and a plurality of outputs indicating new locations of output membership functions; and
a fuzzy control logic having a first plurality of inputs for receiving the output of said input processing means, a second plurality of inputs connected to the plurality of outputs from said adaptation mechanism, a first plurality of outputs connected to the second plurality of inputs of said adaptation mechanism, a second plurality of outputs connected to the third plurality of inputs of said adaptation mechanism, and a third plurality of outputs indicating raw control command information;
wherein said fuzzy control logic comprises:
a fuzzifier having a first plurality of inputs for receiving the output of said input processing means, and a second plurality of inputs indicating shapes and locations and a set of outputs providing a fuzzified output of said input processing means, indicating shapes and locations of the input membership functions, wherein the fuzzified output is taking measured values of the output and transforming them in view of the input membership functions for the outputs;

a collection of input membership functions having a plurality of outputs connected to the second plurality of inputs of said fuzzifier;

a fuzzy rule base having a plurality of outputs for indicating and mapping a combination of input membership functions to each output membership function;

a fuzzy inference engine having a plurality of inputs connected to the plurality of outputs of said fuzzifier, having a second plurality of inputs connected to the plurality of outputs of said fuzzy rule base, and having a plurality of outputs, for indicating the degree to which each fuzzy rule is used;

a collection of output membership functions having a first plurality of outputs indicating the shape and locations of the output membership functions, a second plurality of outputs indicating the current locations of the output membership functions, and a plurality of inputs indicating the new locations of the output membership functions; and a defuzzifier having first and second pluralities of inputs connected to the outputs of said fuzzy inference engine and of said collection of output membership functions, having a plurality of outputs indicating raw command information signals;

output processing means, having a plurality of inputs connected to the plurality of outputs of said defuzzifier, and a plurality of outputs indicating raw control command information, signals for transforming, normalizing, scaling, filtering, integrating, taking derivatives, and/or digital-to-analog converting raw command information signals into actuating signals; and a process having a first plurality of inputs connected to the plurality of outputs of output processing means, a second plurality of inputs receiving measured disturbances of the process, and a plurality of outputs indicating at least one property of a parameter or parameters being controlled.

6. The controller of claim 5 wherein:

said adaptation mechanism computes an error measure from the output of said input processing means, and determines whether the absolute value of the error measure is less than an adaptation threshold;

if the error measure is less than the adaptation threshold, then no change to output membership functions is made;

if the error measure is equal to or greater than the adaptation threshold, then degrees of membership of the fuzzy logic rules $\mu_{Rj}$ and the current locations of output membership functions Rj are received from said fuzzy control logic via the second and third pluralities of inputs of said adaptation mechanism;

new locations Rj' of the output membership functions Rj are calculated according to $$\frac{dRj}{dt} = \gamma \mu_{Rj} J,$$

where $\gamma$ is a rate of adaptation of the adaptive fuzzy logic controller which indicates rate that the output membership functions change locations, and $$Rj' = Rj + \frac{dRj}{dt} \Delta t,$$

where $\Delta t$ is the time difference between the current locations and the new locations of the output membership functions; and the new locations of output membership functions are passed from the plurality of outputs of said adaptation mechanism.

7. An adaptive fuzzy logic controller for controlling a process parameter of a process, comprising:

an input processing unit;

an adaptive fuzzy control logic, connected to said input processing unit, comprising:

an adaptation mechanism for:

computing an error measure;

determining whether the absolute value of the error measure is greater than or equal to an adaptation threshold value; and obtaining degrees of membership of fuzzy rules and current locations of output membership functions of the fuzzy rules, and calculating new locations of the output membership functions of the fuzzy rules, only if the absolute value of the error measure is greater than or equal to the adaptation threshold value; and a fuzzy control logic unit comprising:

a fuzzifier for receiving and transforming a process parameter measurement and a process parameter setpoint into a process parameter measurement signal coded with a first set of shapes and locations of input membership functions and a process parameter setpoint signal coded with a second set of shapes and locations of input membership functions;

a collection of input membership functions for providing said fuzzifier with sets of shapes and locations of input membership functions;

a collection of output membership functions, for providing current locations of output membership functions to said adaptation mechanism and for receiving new locations of the output membership functions;

a fuzzy rule base for receiving sets of shapes and locations of input membership functions from said collection of input membership functions, receiving sets of shapes and locations of output membership functions from said collection of output membership functions, and mapping a combination of input membership functions to each output membership function;

a fuzzy inference engine for receiving the process parameter measurement signal coded with a first set of shapes and locations of input membership functions and the process parameter setpoint signal coded with a second set of shapes and locations of input membership functions, receiving a mapping of a combination of input membership functions to each output membership function, indicating the degree to which each fuzzy rule is used, and providing the degrees of membership of the fuzzy rules to said adaptation mechanism; and a defuzzifier for receiving sets of shapes and locations of output membership functions from said collection of output membership functions, receiving degrees of membership of the fuzzy rules, and providing command information signals for controlling the process; and an output processing unit connected to said adaptive fuzzy control unit.

8. The adaptive fuzzy logic controller of claim 7, further comprising:

a sensor connected to said input processing unit; and an actuator connected to said output processing unit.

9. The adaptive fuzzy logic controller of claim 8, wherein:

the process is temperature control of a furnace;

said sensor comprises a temperature sensor;

the process parameter is furnace temperature; and said actuator is an actuator of a valve which controls a flow of fuel to the furnace.

10. The adaptive fuzzy logic controller of claim 8, wherein:

the process is a vehicle speed control;

said sensor comprises a speedometer the process parameter measurement is a speed of the vehicle; and the actuator is a servo control of a throttle position which controls the speed of the vehicle.

11. The adaptive fuzzy logic controller of claim 8, wherein:

the process is temperature control of a space;

the sensor comprises:
   a space temperature sensor; and
   an outside air temperature sensor;

the process parameter measurement is space temperature; and said actuator is a relay of a valve which controls a flow of fuel or electrical power to a space heater or cooler.

12. The adaptive fuzzy logic controller of claim 8, wherein:

the process is duct air temperature control for an air handling unit in an HVAC system;

the sensor comprises:
   a duct air temperature sensor; and
   an upstream air temperature sensor; and said actuator is an actuator that controls a water valve position.

13. The adaptive fuzzy logic controller of claim 8, wherein:

the process a duct static pressure control for an air handling unit in an HVAC system;

the sensor is a duct static pressure sensor;

the process parameter measurement is a duct static pressure; and said actuator is a device which controls air flow.

14. The adaptive fuzzy logic controller of claim 8, wherein:

the process is water temperature control of a boiler;

said sensor comprises:
   a temperature sensor; and
   a flow rate sensor;

the process parameter measurement is water temperature; and said actuator is an actuator of a valve which controls a flow of fuel to a combustion process of the boiler, for changing the temperature of water.

15. The adaptive fuzzy logic controller of claim 8, wherein:

the process is a vehicle speed control;

said sensor comprises a vehicle speed indicator;

the process parameter measurement is a speed of the vehicle; and the actuator affects the speed of the vehicle.

16. The adaptive fuzzy logic controller of claim 8, wherein:

the process is temperature control of a furnace for curing parts;

said sensor comprises a temperature sensor;

the process parameter is part temperature; and said actuator provides a furnace wall setpoint temperature.

17. The adaptive fuzzy logic controller of claim 8, wherein:

the process is temperature control of a space;

the sensor is a space temperature sensor;

the process parameter measurement is space temperature; and said actuator is a relay of a valve which controls a flow of water to a convector.

18. The adaptive fuzzy logic controller of claim 8, wherein:

the process is duct air temperature control for an air handling unit in an HVAC system;

the sensor comprises:
   a duct air temperature sensor; and
   an upstream air temperature sensor; and said actuator is an actuator that controls a valve position.

* * * * *